Jan. 16, 1940.  J. A. SMETHERS  2,187,405
DRILL STEM DRIVE
Filed Jan. 18, 1938
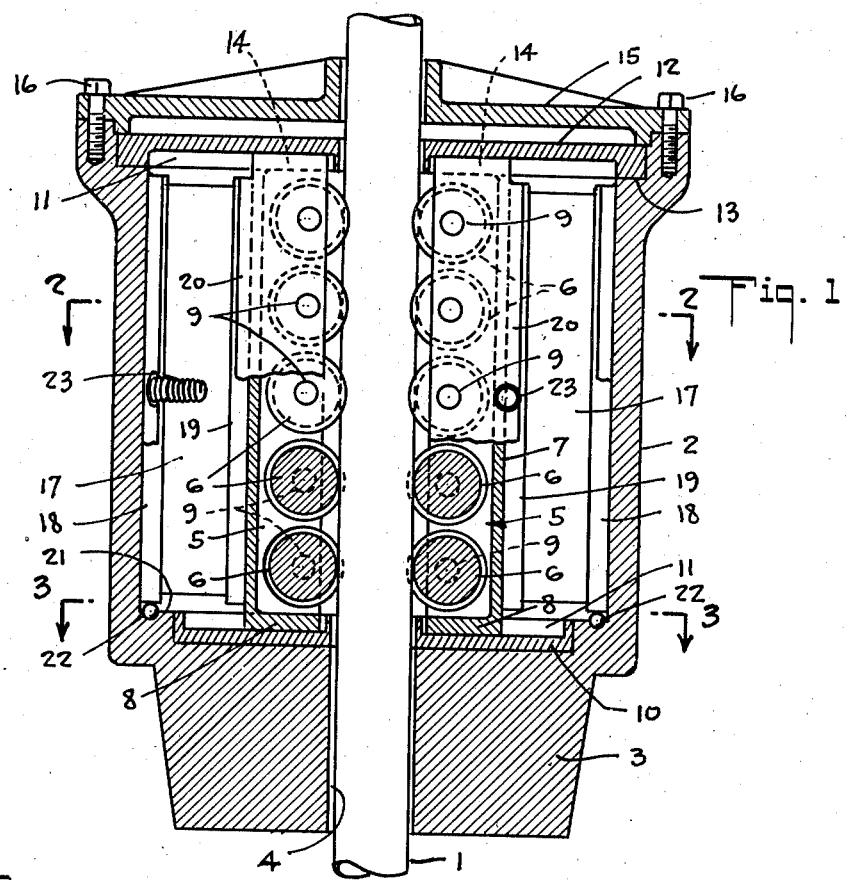
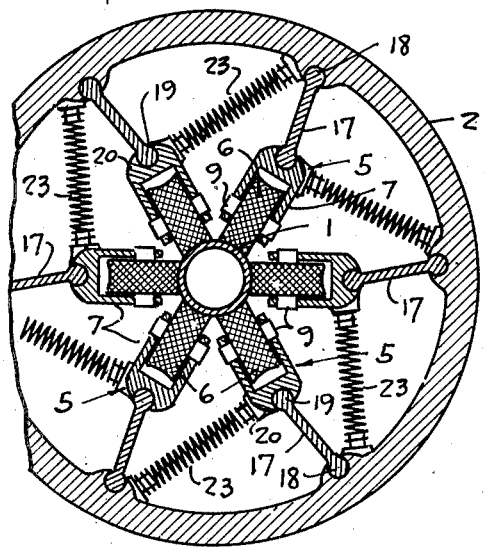
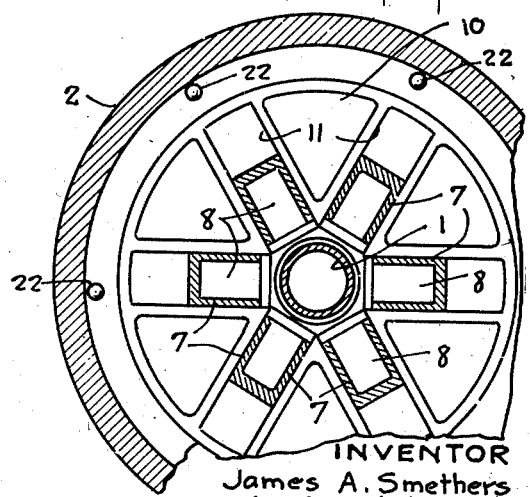
INVENTOR
James A. Smethers
BY John Flam
ATTORNEY Patented Jan. 16, 1940

2,187,405

UNITED STATES PATENT OFFICE 2,187,405

DRILL STEM DRIVE

James A. Smethers, Odessa, Tex.

Application January 18, 1938, Serial No. 185,542

13 Claims. (Cl. 255—23)

This invention relates to a rotary drive mechanism for the drilling of wells.

It has been common to provide a rotary drilling machine to drive a "kelly" or drill stem extending downwardly into a well. Such a drill stem has most commonly been in the form of an angle-faced bar which can be fed downwardly through a correspondingly formed aperture in the drive bushing. By virtue of the angular facing of the stem (such as one having a square cross-section), the bushing is in driving relation thereto.

Recently the mode of drilling involving maintenance of fluid pressure in the well, has become quite common, and is generally referred to as "pressure drilling". In such cases, of course, precautions must be taken to provide a seal around the drill stem. In order to make this possible, it is necessary to use a round type of stem instead of an angular faced kelly; and for this purpose, the stem is usually of the flush joint type. Thus a round stem having no large variations in diameter, is fed downwardly through the rotary. It is sealed off by a packing gland or rubber stripper head.

Since a round drill stem does not inherently provide a driving connection to the rotary table, a separate driving mechanism for effecting the connection is necessary. In general, prior to this invention, such drives as have been proposed usually defaced or injured the pipe, as by the use of grips or rollers that dented or crushed it. Others that have been proposed do not provide a satisfactory driving grip.

It is one of the objects of this invention to provide a flush joint drive that obviates these disadvantages.

It is another object of this invention to make it possible to move the stem in or out of the well, even while it is being rotated.

It is still another object of this invention to provide a drive mechanism that is so arranged as to enclose all of the working parts.

It is still another object of this invention to provide a simple and effective flush joint drive that is automatically adjusted to cooperate with the pipe, during operation, without danger of losing a driving grip.

It is still another object of this invention to provide a gripping mechanism that almost entirely encircles the pipe and yet insures substantial uniformity of pressure on the pipe, thereby minimizing the danger of local creasing or crushing of the pipe.

It is still another object of the invention to provide a gripping means in which the grip becomes tighter the greater the resistance to rotation of the string.

This invention possesses many other advantages, and has other objects which may be made more easily apparent from a consideration of one embodiment of the invention. For this purpose there is shown a form in the drawing accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawing:

Figure 1 is a view, mainly in longitudinal section, of an apparatus embodying the invention, shown in cooperation with a flush joint type of drill stem;

Fig. 2 is a cross sectional view taken along plane 2—2 of Fig. 1; and

Fig. 3 is a cross sectional view taken along plane 3—3 of Fig. 1.

The drill stem 1 is shown in the present instance as extending vertically downward through a casing 2. It is shown as of the flush joint type, or at least one in which the joints do not materially exceed the diameter of the main portion of the drill stem.

The casing 2, with its square lower extension 3, is intended to be rotated about the axis of the stem 1, as by the aid of the usual rotary mechanism. The square extension 3 is adapted to fit within the square opening in a rotary table or the like. The stem 1 is shown as passing through a clearance aperture 4, which is provided through the extension 3.

Rotation of casing 2 in a clockwise direction, as viewed in Fig. 2 or 3, causes a plurality of gripping members, connected to the casing, to engage the drill stem 1, and thereafter to exert a turning moment upon it. The gripping members are preferably in the form of roller racks 5. Since these roller racks are identical in construction, but one of them need be described in detail. It is of course understood that there may be as many of these roller racks disposed angularly about the axis of the drill stem 1 as required. In the present instance, six such roller racks are indicated in Figs. 2 and 3. A sufficiently large number is chosen so that the gripping rollers 6 supported by the racks, engage a substantial portion of a complete peripheral band on the stem 1.

Each roller rack comprises a vertical channel member 7. The ends of the channels may be closed, as indicated by the end flanges 8 and 14. Extending across the arms of the channels are a plurality of pivot pins 9 arranged in vertical sequence. Upon these pins are rotatably mounted the gripping rollers 6. In the present instance, each roller rack 5 is shown as accommodating five rollers.

The rollers 6 are preferably made of hardened material and their peripheries are made concave, as illustrated most clearly in Fig. 2. In order to insure uniform gripping without deformation or damage to the drill stem pipe 1, the peripheries of the rollers may be provided with diagonal knurls.

In order to grip the stem 1, the roller racks 5 should be urged inwardly in a radial direction against the stem 1. When these rollers are in gripping relation, a driving connection exists between the casing 2 and the stem 1. At the same time, however, it is possible to raise or lower the stem 1 through the rollers, irrespective of this grip. There is no material friction to overcome in performing this operation, for the bearings of the rollers 6 may be well lubricated. Accordingly, the usual weight indicators may operate without appreciable error.

The rotation of the casing 2 acts automatically to urge the roller racks 5 inwardly against the pipe 1. In order to accomplish this result, the roller racks are joined to the inside of the casing 2 by toggle mechanisms, and furthermore these racks are guided in radial guides in the top and bottom of the casing 2. One of these radial guides is shown to best advantage in Fig. 3. It comprises a plate 10 having the radial guideways 11 therein. In these guide ways are disposed the bottom flanges 8 of the racks 5. A similar radial guide plate 12 is disposed upon the shoulder 13 adjacent the top of the casing 2. In this guide plate 12 are located the upper flanges 14 of the roller racks 5. The guide plates 10 and 12 are not permanently joined to the casing 2, but are free to align themselves in accordance with the requirements of the roller rack motion. However, they insure that the rollers carried by the roller racks squarely engage the drill stem 1. A cover 15 may be disposed over the casing 2 and joined to it as by the aid of the bolts 16 passing through the contiguous flanges of the cover 15 and casing 2. In this way the operating mechanism is substantially enclosed.

The toggle mechanisms for operating the roller racks 5 may best be described in connection with Figs. 1 and 2. Each of the roller racks is joined to the casing 2 by the aid of a ling 17. This link has an enlarged edge 18 forming a hinge connection with the inner wall of casing 2. At its other edge the link 17 is provided with a similar enlarged hinge portion 19, accommodated in a socket member 20 extending the full length of the rack 5.

As casing 2 is rotated in a clockwise direction, as viewed in Fig. 2, there is a straightening effect of the link 17, tending to align it in a radial direction. The resultant toggle effect urges the corresponding roller rack 5 inwardly with relation to its guides in the guide plates 10 and 12. The resultant effect is a simultaneous gripping of the drill stem 1 by all of the rollers in all of the racks.

In order to insure against the creation of too much friction by resting of the enlarged hinged portion 18 on the shoulder 21 of the casing 2, there may be inserted a number of thrust ball bearings 22 contacting with the bottom of the enlarged portion 18.

The rotation of casing 2 in the proper direction automatically causes the gripping action to take place. There is no need for manual adjustments or the like, because all of the racks are substantially uniformly advanced and retracted. Furthermore, as the stem 1 is fed downwardly or upwardly, the rollers can accommodate themselves to the required peripheral diameter of the stem, which may not be uniform. The action of all of the rollers is uniform.

The mode of operation of the device is apparent from the foregoing. In order to secure the toggle action, of course the link 17 and the rack 15 5 would not come into exact radial alignment with the axes of the stem 1, no matter how small in diameter this stem may be. However, as the stem 1 encounters greater resistance, the effect of this resistance is to cause the toggle mechanisms to urge the roller racks 5 more strongly against the stem 1. In this way there is never any loss of grip, in spite of the fact that the stem 1 may easily be raised or lowered through the well lubricated rollers 6.

In order to insure that each roller rack 5 engages instantly, as well as simultaneously with the racks, upon movement of the case 2 in a clockwise direction, a compression spring 23 is arranged between the case and each of the roller racks. These springs are effective to urge the toggle toward its straight position and bring the rollers 6 into contact with the drill stem 1 at all times, thus immediately upon movement of the case, the rollers grip the drill stem. Upon termination of the clockwise movement, a slight movement of the case in the opposite direction will free the rollers from the stem, except for the small pressure resulting from springs 23.

What is claimed is:

1. In a drive for a rotary drill stem, a plurality of angularly spaced grippers adapted to engage the stem along a substantial length thereof, upper and lower radial guides for the grippers, and means forming a toggle joint mechanism with each gripper to urge it toward engaging position.

2. In a drive for a rotary drill stem, a plurality of angularly spaced grippers adapted to engage the stem along a substantial length thereof, upper and lower radial guides for the grippers, and a common rotary member for urging the grippers inwardly and for imparting rotation to the stem.

3. In a drive for a rotary drill stem, a plurality of roller members having gripping faces adapted to contact with the stem, and also having axes extending in a direction transverse to the stem axis, upper and lower guides for the roller members, a rotary member encompassing the roller members, having an axis coincident with the stem axis, and mechanism for joining the rotary member and the roller members for causing, upon rotation of the rotary member, the roller members to be urged into gripping relation to the stem for driving it.

4. In a drive for a rotary drill stem, a plurality of roller members having gripping faces adapted to contact with the stem, and also having axes extending in a direction transverse to the stem axis, upper and lower guides for the roller members, a rotary member encompassing the roller members, having an axis coincident with the stem axis, and a toggle link for each roller member and joining it to the rotary member.

5. In a drive for a rotary drill stem, a casing adapted to be rotated by a rotary mechanism and through which a drill stem is adapted to extend, a plurality of roller racks angularly spaced about the axis of the stem and within the casing, each of said racks pivotally supporting a plurality of rollers adapted to engage the stem, upper and lower radial guides for the racks, and a link connection between each rack and the casing, said link connection extending along the length of the respective rack and having a hinge connection with the rack and with the casing.

6. In a drive for a rotary drill stem, a casing adapted to be rotated by a rotary mechanism and through which a drill stem is adapted to extend, a plurality of roller racks angularly spaced about the axis of the stem, and within the casing, upper and lower radial guides for the racks, and a link connection between each rack and the casing, and having a hinge connection with the rack and with the casing.

7. In a drive for a rotary drill stem, a casing adapted to be rotated by a rotary mechanism and through which a drill stem is adapted to extend, a plurality of roller racks angularly spaced about the axis of the stem, and within the casing, radial guides for the racks, a link connection between each rack and the casing, and having a hinge connection with the rack and with the casing, and means resiliently urging to keep the link connection toward a radial thrust position.

8. In a drive for a rotary drill stem, a casing adapted to be rotated by a rotary mechanism and through which a drill stem is adapted to extend, a plurality of roller racks angularly spaced about the axis of the stem, and within the casing, radial guides for the racks, and a link connection between each rack and the casing, and having a hinge connection with the rack and with the casing, each of said racks including a plurality of gripper rollers pivotally mounted on axes transverse to the stem axis, and in vertical arrangement.

9. In a drive for a rotary drill stem, a casing adapted to be rotated by a rotary mechanism and through which a drill stem is adapted to extend, a plurality of roller racks angularly spaced about the axis of the stem, within the casing, and connections from the casing to the racks arranged to exert a radial thrust upon the racks and toward the stem, upon rotation of the casing in one direction, and means to maintain the angular spacing between the racks substantially constant, comprising upper and lower guides.

10. In a drive for a rotary drill stem, a casing adapted to be rotated by a rotary mechanism and through which a drill stem is adapted to extend, a plurality of roller racks angularly spaced about the axis of the stem and within the casing, each of said racks pivotally supporting a plurality of rollers adapted to engage the stem, upper and lower connections from the casing to the racks arranged to exert a radial thrust upon the racks and toward the stem, upon rotation of the casing in one direction, means resiliently urging the connections in a direction to move the racks toward the stem, and means to maintain the angular spacing between the racks substantially constant, comprising upper and lower guides.

11. The combination as set forth in claim 9, in which the connections and the racks form a series of toggle mechanisms that tend to straighten when the casing rotates in one direction.

12. In a drive for a rotary drill stem, a casing adapted to be rotated by a rotary mechanism and through which a drill stem is adapted to extend, a plurality of roller racks angularly spaced about the axis of the stem and within the casing, each of the racks pivotally supporting a plurality of rollers adapted to engage the stem, means guiding the racks for radial movement and to maintain the angular spacing between them substantially constant, said means comprising upper and lower members rotatably supported in the casing coaxially with the drill stem, and at opposite ends of the racks respectively, connections between the casing and the racks arranged to exert a radial thrust upon the racks toward the stem upon rotation of the casing in one direction, and means resiliently urging the connections in a direction to move the racks toward the stem.

13. In a device adapted to form a driving connection between a rotary machine and a drill stem, a cylindrical casing adapted to be connected to the rotary machine substantially coaxially with the stem, upper and lower members rotatably carried by the casing and coaxial therewith, each of said members having a plurality of guides radial to the axis of the casing, gripper racks extending between the members and slidably supported in said guides, each of said racks carrying gripping means adapted to engage the stem upon inward radial movement of the racks, and means interposed between the casing and the racks whereby relative rotation between the casing and the guide members will be effective to move said racks inwardly.

JAMES A. SMETHERS.